United States Patent
Howe

(10) Patent No.: US 10,746,512 B2
(45) Date of Patent: Aug. 18, 2020

(54) SHOT TRACKING AND FEEDBACK SYSTEM

(71) Applicant: Garmin Switzerland GmbH, Schaffhausen (CH)

(72) Inventor: Jason D. Howe, Olathe, KS (US)

(73) Assignee: Garmin Switzerland GmbH (CH)

( * ) Notice: Subject to any disclaimer, the term of this patent is extended or adjusted under 35 U.S.C. 154(b) by 243 days.

(21) Appl. No.: 15/849,005

(22) Filed: Dec. 20, 2017

(65) Prior Publication Data

US 2019/0186876 A1 Jun. 20, 2019

(51) Int. Cl.
| | |
|---|---|
| *F41J 5/14* | (2006.01) |
| *F41J 9/00* | (2006.01) |
| *G01S 13/66* | (2006.01) |
| *G06T 7/70* | (2017.01) |
| *G01S 13/86* | (2006.01) |
| *G09B 5/02* | (2006.01) |
| *G09B 9/00* | (2006.01) |

(52) U.S. Cl.
CPC . *F41J 5/14* (2013.01); *F41J 9/00* (2013.01); *G01S 13/66* (2013.01); *G01S 13/865* (2013.01); *G01S 13/867* (2013.01); *G06T 7/70* (2017.01); *G09B 5/02* (2013.01); *G09B 9/006* (2013.01)

(58) Field of Classification Search
CPC . F41J 5/14; F41J 9/00; F41J 2/00; F41J 2/02; F41J 5/02; F41J 5/08; F41J 5/12; G06T 7/70; G01S 13/66; G01S 13/865; G01S 13/867; G09B 5/02; G09B 9/006

USPC .......................................................... 342/52
See application file for complete search history.

(56) References Cited

U.S. PATENT DOCUMENTS

| | | | | |
|---|---|---|---|---|
| 8,149,156 | B1* | 4/2012 | Allred | G01S 13/583 342/146 |
| 8,794,967 | B2* | 8/2014 | Sargent | A63F 13/06 434/19 |
| 9,267,761 | B2 | 2/2016 | Stewart | 396/426 |
| 9,546,846 | B2 | 1/2017 | Stewart | 396/419 |
| 9,605,926 | B1* | 3/2017 | Means | F41G 3/26 |
| 10,379,214 | B2* | 8/2019 | Tuxen | G01S 13/58 |
| 2009/0295624 | A1* | 12/2009 | Tuxen | G01S 13/58 342/147 |
| 2015/0268338 | A1* | 9/2015 | Freiburger | B60W 10/06 701/36 |
| 2018/0003816 | A1* | 1/2018 | Olson | G01S 7/354 |
| 2019/0056198 | A1* | 2/2019 | Pautler | G01C 3/02 |

* cited by examiner

*Primary Examiner* — Peter M Bythrow
*Assistant Examiner* — Michael W Justice
(74) *Attorney, Agent, or Firm* — Samuel M. Korte; Max M. Ali

(57) ABSTRACT

A shot tracking and feedback system is disclosed that uses a camera to track a shot fired from a weapon and a moving target, such as a clay target. Radar may be used in conjunction with the camera to track the shot and the moving target. Tracking the moving target and the shot allows for determination of the paths of the shot and the target to determine and provide performance feedback, such as whether the shot was above or below the target and/or to the left or right of the target. The performance feedback and additional information may be provided on a display of the system or a user device having a display (e.g., watch, smartphone, etc.). A user may utilize the presented information to improve shooting accuracy.

19 Claims, 9 Drawing Sheets

SHOT TRACKING AND FEEDBACK SYSTEM

BACKGROUND

The present disclosure relates generally to a shot tracking and feedback system. Clay target shooting is practiced all over the world and includes several disciplines, such as trap shoot, skeet shooting, sporting clays and the like. In these sports, a clay pigeon is thrown out of one or more houses and a weapon (e.g., a shotgun) is used to shoot the clay pigeon after it is thrown out of the houses. FIG. 1 illustrates an exemplary trap field 102. As shown in FIG. 1, a trap house 104 (target throwing machine) is located at a distance from the shooting stations 108 located in the trap field 102. Multiple shooting locations may be provided at each shooting station 108 to account for shooter skill and difficulty. Shooters move through each of the shooting stations 108 in the trap field to shoot at the targets launched from the trap house 104. Olympic target shooting may have different layouts and launch angles.

When target shooting with a shotgun, there is very little feedback as to how well the shooter is performing other than observing whether each shot resulted in a hit (strike) or miss of each target. Specifically, if the shooter misses a target, it is difficult to determine whether the shot was above, below, ahead of or behind the intended target. Even in the event of a hit of the target, it is difficult to know whether the shot struck near the center of target or whether the shot struck the target sufficiently well to break the target clay (i.e., an off-center shot). This uncertainty may make trapshooting to be a very difficult and, at times, frustrating sport. It is frustrating to shooters to not understand how they may improve and misunderstandings about their performance may require tedious, expensive, and random trial and error for improvement of the shooter's shooting technique. The shooter may also unknowingly reinforce bad habits without adequate feedback.

Several conventional methods exist for improving shooting technique but the conventional methods fall short in some regard. For example, a shooter can ask observer, such as a coach, to stand behind the shooter and observe the shot to provide feedback as to how a shot missed the target. However, this approach requires dedicated time from an observer and is subject to the observer's ability to determine how the shooter missed. In another example, some conventional gun-mounted camera systems record video of the shot to enable a user to see the shot cloud in relation to the clay when the video is played back, which typically occurs on a computer at the shooter's home or on a smart device via a software application. The conventional cameras are typically aligned to the shooter's gun (e.g., mounted to the gun barrel). Additionally, although the conventional camera systems are not heavy, mounting the conventional camera system to the gun barrel adds some weight to the barrel of the gun, which can affect balance and shooting performance. The conventional camera systems do not provide a true indication or feedback as to how the shooter missed. In another example, some conventional shotgun shells include a wad corresponding to a path of the shell that enables tracking the path of the shot for a period of time after leaving the shotgun. These conventional shotgun rounds are about twice as expensive as standard rounds. Although these rounds can assist a shooter understand how the shot missed, the path of the wad can be misleading particularly in determining whether the shot is ahead of or behind or above or below the target because the wad is significantly slower than the shot. Other conventional systems include indoor training systems that use lasers. For example, a light source may be positioned to project a laser on a wall to represent targets and another light source may be mounted on the gun to project a laser indicating a current direction of the barrel to observe where the gun is pointed. In such conventional systems, a camera typically monitors where the laser output from the gun is pointed relative to the target when the shot is fired. These conventional systems are relatively expensive and require a large indoor area for set up.

Another problem for target shooters (e.g., using a bow, crossbow, rifle, pistol or other weapon) is that the shooters may determine and manually record their scores. However, the conventional systems and software typically used to determine a shooter's score is typically cumbersome and takes considerable time to use. Thus, none of the conventional systems provide adequate feedback on the shooter's technique or provide recommendations to the shooter to improve their performance in real time.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the present technology include a shot tracking and feedback system that tracks the path of a shot and a moving target (clay) using optical (camera) and/or radar technology. The shot tracking and feedback system may be placed in front of, beside or behind the trap shooter and pointed at the trap house. The shot tracking and feedback system provides immediate feedback about where the shot path was relative to the path of the moving target. This feedback may enable the trap shooter to take corrective action to improve shooting performance. The shot tracking and feedback system can also automatically determine whether a shot resulted in a successful strike and keep score, which may enable the trap shooter to focus on shooting desired targets. The shot tracking and feedback system may also store in a memory performance metrics.

According to aspects of the invention, a shot tracking and feedback system is disclosed that includes a display, a camera configured to collect images of a moving target in a field of view, a memory configured to store a plurality of images received from the camera, and a processing system communicatively coupled with the memory. The processing system may be configured to determine a location of the shot at a plurality of instants of time, determine a trajectory of the moving target based on the stored images, determine a location of the moving target at the plurality of instants of time based on the determined trajectory of the moving target, and control the display to present a shot image including the determined locations of the shot and the moving target.

According to other aspects of the invention, a shot tracking and feedback system includes an optical subsystem, a radar subsystem, and a processing system communicatively coupled with the optical subsystem and the radar subsystem. The optical subsystem includes a camera configured to collect images of a moving target in a field of view and the radar subsystem includes a radar transmitter configured to output radar signals in a radar sensor field and a plurality of receivers configured to collect reflected radar signals from the radar sensor field. The processing system may be configured to receive the images and the reflected radar signals, determine a location of the shot based on the reflected radar signals at a plurality of instants of time, determine a location of the moving target based on the images at the plurality of instances of time, determine a trajectory of the shot and a trajectory of the moving target based on the determined locations of the shot and the moving target at the plurality of instants of time, respectively, and determine whether the shot strikes the moving target based on the determined trajectories of the shot and the moving target.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
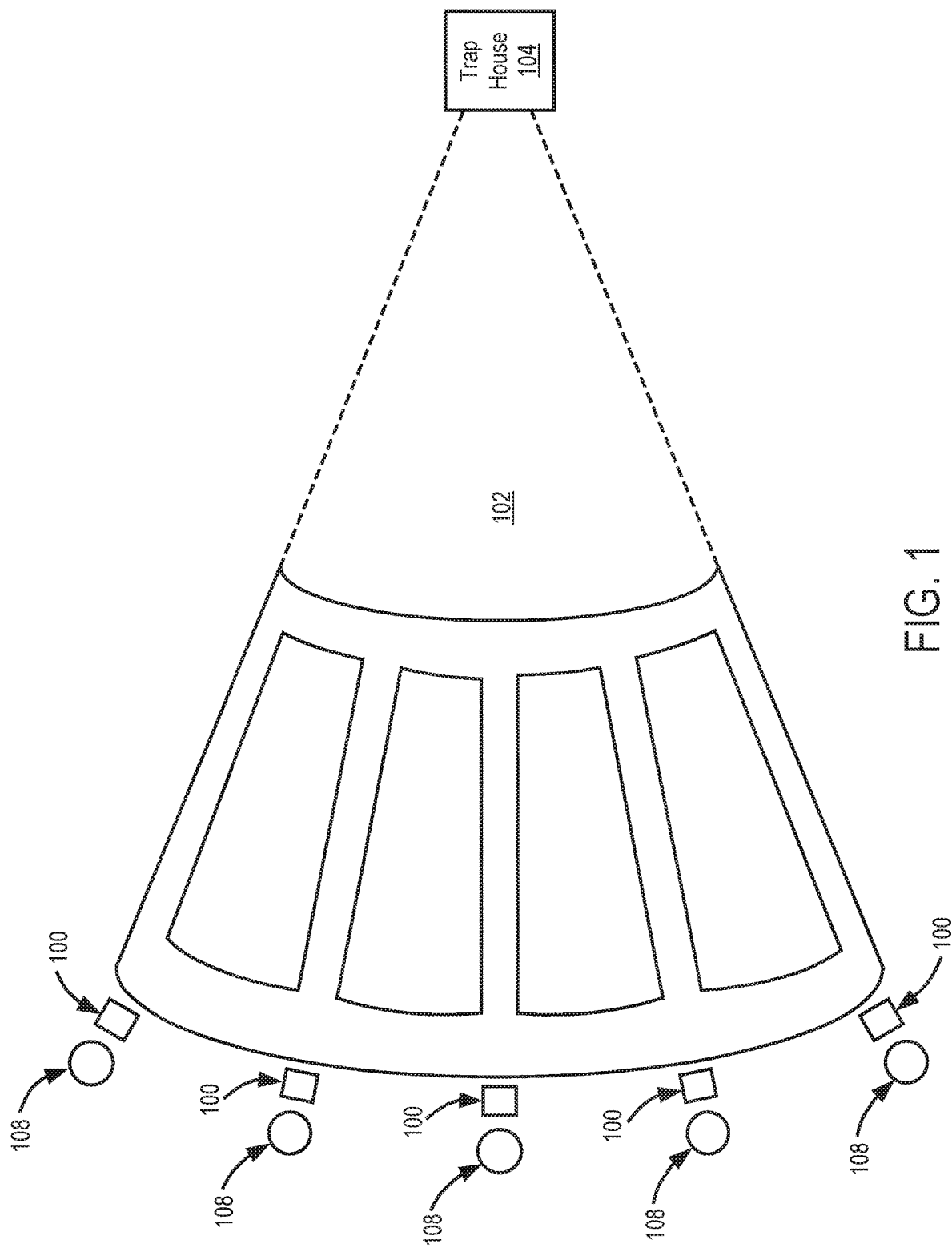
FIG. 1 is a schematic diagram of an exemplary trap field.

In the following description of embodiments of the invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Embodiments of the invention are directed to technology for detecting and tracking a shot using radar, tracking and modeling a clay path using video, and determining where the shot was relative to the location of the clay. A shot tracking and feedback system including a processing system, a radar system and an optical camera is aligned with the trap house from each shooting station in the trap field. The shot tracking and feedback system may be positioned proximate to the shooter such that the location of the shooter corresponds to the location of the shot tracking and feedback system.

In order to track the shot from the gun, the shot tracking and feedback system tracks the shot to achieve a desired precision (e.g., within 0.25 meters) by determining a location of the shot at a plurality of instants of time and a trajectory of the shot based on the determined locations. In embodiments, the shot tracking and feedback system may determine a plurality of locations of a plurality of pellets associated with the shot. For example, the shot may be a shotgun shell including 450 lead balls (2.0 mm) travelling up to 393 m/s (880 mph). It is to be understood that the shot may correspond to other ballistics, such as a bullet, or an arrow (originating from a bow). The shot may travel at any speed suitable to be monitored by the shot tracking and feedback system.

The shot tracking and feedback system may determine the location and trajectory of the shot by implementing a variety of techniques. In some embodiments, the shot tracking and feedback system includes a camera configured to collect images of the shot in a field of view. In such embodiments, the shot tracking and feedback system determines a location of the shot at a plurality of instants of time using the images. In other embodiments, the shot tracking and feedback system includes radar elements (e.g., a radar transmitter, a radar receiver, radar antenna elements, etc.) configured to output radar signals in a radar sensor field and receive reflections from the radar sensor field to determine a location and a trajectory of the shot utilizing reflected radar signals. The shot tracking and feedback system may utilize the images or radar signals to track the shot and determine a shot velocity, which may be used to calculate a distance from the shot tracking and feedback system to the shot. The processing system may determine an angle of the shot may also be determined using the images or the radar signals. In some configurations, the determined angle may be within 0.5 degrees accuracy to the actual shot angle. More particularly, in some embodiments, the shot tracking and feedback system may include multiple receive antennas and utilize interferometry techniques to determine the shot angle.

In embodiments, the shot tracking and feedback system includes a display that is utilized to present a shot image including the determined locations of the shot and the moving target for one of a plurality of instants of time. The shot image may also include the determined trajectory of the shot and the moving target, respectively, for one of the plurality of instants of time. The shot tracking and feedback system may also include a user interface (e.g., touchscreen display, push buttons, etc.) that enable the processing system to receive one or more inputs to enable selection of an instant of time for which to present the determine locations and/or trajectories of the shot and the moving target in the shot image. In embodiments, the shot tracking and feedback system may utilize a communication element to control a display of a remote device to present the shot image and related information.

The shot tracking and feedback system also determine the location and trajectory of the moving target (e.g., clay) output by a target throwing machine (typically located in trap house 104) and detects a successful hit of the target by the shot. The shot tracking and feedback system may determine a location of the moving target at the plurality of instants of time based on the stored images. In embodiments, the shot tracking and feedback system may determine a trajectory of the moving target based on the determined locations of the moving target at the plurality of instants of time and a trajectory of the shot based on the determined locations of the shot at the plurality of instants of time.

In embodiments, the determined locations of the shot and the moving target included in the shot image correspond to one of the plurality of instant of time when the shot and the moving target are substantially equal distances from the camera or radar antenna element(s). For example, the shot tracking and feedback system may determine a first distance from the shot to the camera or a radar transmitter, a second distance from the moving target to the camera or a radar transmitter, and whether the first distance is substantially equal to the second distance. The shot image may provide the determined locations of the shot and the moving target corresponding to an instant of time when the first distance is determined to be substantially equal to the second distance. If the locations and/or trajectories of the shot (including a shot cloud having a center point) and the moving target are substantially equal (at least partially overlap) when the first distance is substantially equal to the second distance, the shot tracking and feedback system may identify a successful strike for the shot. If the locations and/or trajectories of the shot (including a shot cloud having a center point) and the moving target are not substantially equal (do not at least partially overlap) when the first distance is substantially equal to the second distance, the shot tracking and feedback system may identify an unsuccessful strike for the shot. The first distance may be determined to be substantially equal to the second distance when the distances are radially equidistant from the radar transmitter and the camera.

Similarly, in embodiments, the shot tracking and feedback system may identify an intersecting point of the trajectory of the shot and the trajectory of the moving target, determine a first instant of time when the trajectory of the shot is located at the intersecting point and determine a second instant of time when the trajectory of the moving target is located at the intersecting point. If the first instant of time is determined to be substantially equal to the second instant of time, the shot image may provide the determined locations of the shot and the moving target corresponding to the first or second instants of time, which are approximately the same time, and the shot tracking and feedback system may identify a successful strike for the shot. If the first instant of time is determined not to be substantially equal to the second instant of time, the shot image may provide the determined locations of the shot and the moving target corresponding to one of the first and second instants of time and the shot tracking and feedback system may identify an unsuccessful strike for the shot.

The moving target may be a 100 g, 110 mm diameter clay object (commonly referred to as an "orange pigeon") that travels at 20 m/s (45 mph) over 71 m when thrown (output) by the target throwing machine. In embodiments, the shot tracking and feedback system includes a single camera that is used to track a distance to an object of known size, such as the clay or the trap house, by using the known dimensions to determine the distance. For instance, in embodiments, the processing system may determine a width of an object depicted in the video footage, compare the determined width of the object depicted in the video footage with the known width of the object, and determine a distance to the object based on the comparison. In other embodiments, the device includes two or more optical cameras to enable the processing system to determine a distance to an object of unknown size (similar to how humans do with our eyes). Use of a second camera may be particularly advantageous for clay shooting and any hunting or shooting of live targets (because the shooter and system cannot know the width of the target before analyzing the video footage).

The optical camera and radar systems may be spatially calibrated and time synced by the processing system. Radar signals may be used by the processing system to measure a speed of a clay target prior to a shooting event to calibrate the thrower/launcher and confirm that the shot tracking and feedback system is calibrated. The processing system may combine the video-tracked target (clay) data and radar-tracked shot data to generate a composite (full) picture of the shot and target and to determine where the shot was relative to the target at any given time. This information may be used to provide immediate and accurate feedback about the user's performance for each shot (e.g., where the shot was relative to the intended target), which can be used to make corrective action and/or to automatically keep score of the game. The processing system may also determine, and store in memory (log), performance metrics (e.g., station, clay launch direction, and hit/miss information), shooter strengths and shooter weaknesses over time (e.g., one shooting event, multiple shooting events, etc.). To help the sportsman improve his performance, the processing system may also determine additional shot metrics, such as a distance to the target at the time of the shot, a shot velocity, and a time between a launch of the target (from trap house 104) and the shot.

The shot tracking and feedback system may include a housing that is rugged, easy to mount and use, and mobile so it may be positioned in front of the trap shooter and pointed at the trap house 104. While uniquely suited for the game of trap, in which the clay target is thrown (launched) a minimum of 16 yards in front of the shooter, the shot tracking and feedback system can also be used by shooters who prefer to shoot at clay targets originating (thrown) from an area near the shooter (e.g., directly next to them), which may be preferred to simulate a pheasant flying up out of the brush to improve their shooting afield as well. The shot tracking and feedback system may be positioned in any location from which the target and shot are within a field of view captured by the camera and a radar sensor field of the radar system to enable a shooter to track a shot and a target and provide performance feedback to the user. The optical subsystem and radar subsystem may be configured such that the field of view and radar sensor field partially or wholly overlap.

The processing system may also be configured to determine and track gun movement because any movement of the gun from a holding position to the shot typically affects accuracy. In one embodiment, the shot tracking and feedback system includes an inertial measurement unit (IMU), which may be used by the processing system to track an orientation of the gun between the clay launch and the shot. The IMU may be mounted on the gun barrel or the user's wrist. The processing system can use received IMU data to determine information relating to aspects of the shooter's form. For example, the processing system may utilize the IMU data to determine a gun hold position, a reaction time, a follow through motion, or a flinching motion.

Referring back to FIG. 1, the shot tracking and feedback system 100 may be positioned in the trap field 102 near a shooting station 108 from which the user shoots at targets. As the shooter moves through the course (from a first station 108 to second station 108), the user moves the shot tracking and feedback system 100 to each station 108 until the user completes the course. At each station 108, the shot tracking and feedback system 100 is aligned with the trap house 104. Alternatively, the shot tracking and feedback system 100 may be positioned in the trap field 102 at any location between station 108 and trap house 104 or in front of trap house 104, which may enable alignment of the shot tracking and feedback system 100 with the trap house 104 and positioning under the target and shot.

Figure 2A:
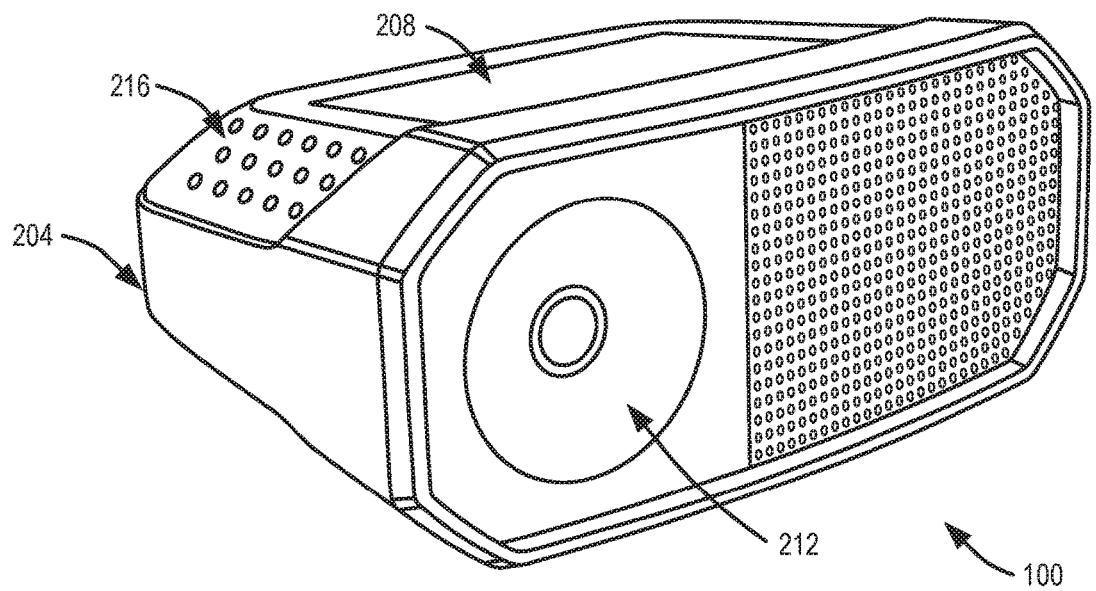
FIG. 2A is a front perspective view of an exemplary shot tracking and feedback system in accordance with one embodiment of the invention.
Figure 2B:
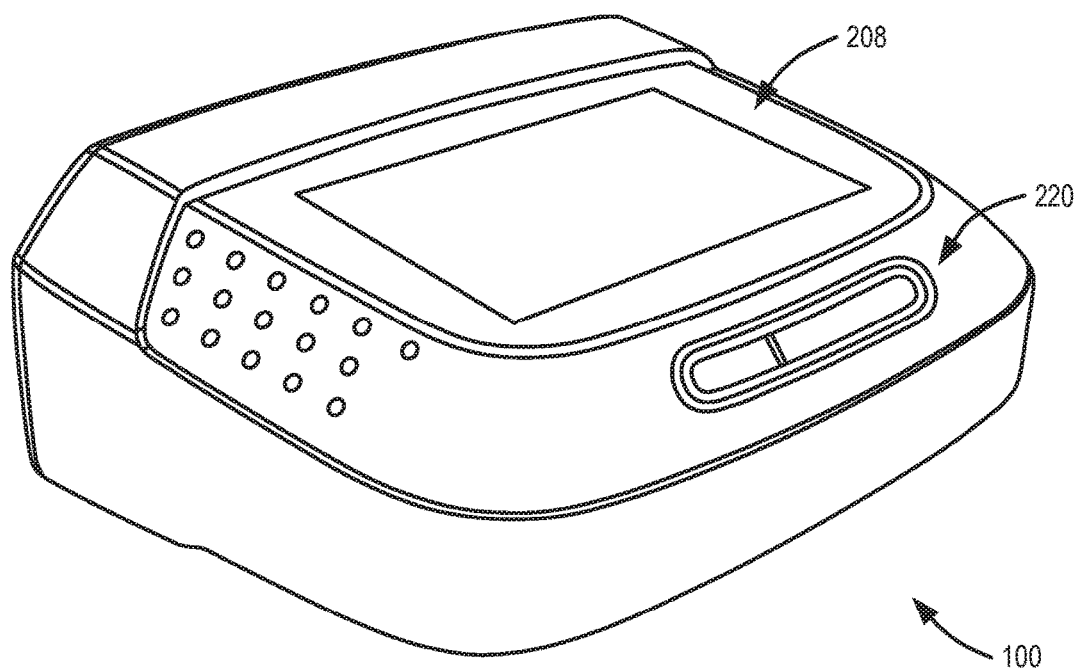
FIG. 2B is a rear perspective view of an exemplary shot tracking and feedback system in accordance with one embodiment of the invention.

FIGS. 2A and 2B illustrate the shot tracking and feedback system 100 according to one embodiment of the invention. As shown in FIGS. 2A and 2B, the shot tracking and feedback system 100 includes a housing 204, a display 208, a camera lens 212, a speaker 216, and a light panel 220. The display 208 may include a touch panel and provide a user interface for the shot tracking and feedback system 100. In one embodiment, the shot tracking and feedback system 100 is positioned at the shooting stations 108 and pointed toward the target house 104 on the trap field. It will be appreciated that the shot tracking and feedback system 100 may be used in combination with conventional shot tracking systems to enable determination of whether a shot hits a target and improve performance. As explained in further detail below, the display 208 provides feedback to the shooter on the display. Feedback may also be provided to the shooter through the speaker 216. In embodiments, the speaker 216 may be disabled (muted) because shooters typically wear hearing protection while shooting. As explained in further detail below, the processing system may use optical data received from camera lens 212 to determine a location of and track the target as described in further detail below, and the processing system may use radar signals received from radar antennas (not shown) inside the housing 204 to determine a location of and track the shot.

The housing 204 generally encloses and protects the components of the shot tracking and feedback system 100 from moisture, vibration, and impact. In one embodiment, the housing 204 is a rugged housing. The housing 204 may be constructed from a suitable lightweight and impact-resistant material such as, for example, plastic, nylon, aluminum, or any combination thereof. The housing 204 may include one or more appropriate gaskets or seals to make it substantially waterproof or resistant. The housing 204 may take any suitable shape or size, and the particular size, weight and configuration of the housing 204 may be changed without departing from the scope of the present technology.

The housing 204 may include mounting hardware for mounting the shot tracking and feedback system 100 to the shooting station 108 or on a tripod or other similar support device near the shooting station 108 from which the shooter is shooting at a target. For example, a ball and socket mount may be used to secure the housing 204 to a tripod that may be positioned at the shooting station 108. Alternatively, the housing 204 may be positioned directly on the ground (i.e., without a tripod or other similar support device). In embodiments in which a tripod and a ball and socket mount is used, the socket may be provided on the shot tracking and feedback system 100, while the ball is attached to a tripod or otherwise provided at or near the shooting station 108. When the socket is removed from the ball, the socket, which is recessed, allows the system 100 to sit on a flat surface such that it can remain stable on a flat surface (e.g., while charging) and may allow device operation on a flat surface without the use of a tripod. The socket mechanism may be attached to the field serviceable battery door so it can be replaced by the user if damaged. In one particular embodiment, the ball features an industry standard threaded insert for attaching to the tripod. Adjustments to the alignment of the system 100 relative to the trap house 104 can made with the ball and socket mechanism.

The display 208 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), electronic paper display (E Ink), or the like, or combinations thereof. The display 208 may possess a circular or square shape or the display 208 may include a rectangular aspect ratio, as shown in FIGS. 2A and 2B, that may be viewed in either a landscape or a portrait mode. In various embodiments, the display 208 may also include a touch screen occupying the entire screen or a portion thereof so that the display 208 functions as a user interface. The touch screen may allow the user to interact with the system 100 by physically touching, swiping, or gesturing on areas of the screen.

The user interface generally allows the user to utilize inputs and outputs to interact with the shot tracking and feedback system 100. Inputs may include buttons, pushbuttons, knobs, jog dials, shuttle dials, directional pads, multi-directional buttons, switches, keypads, keyboards, mice, joysticks, microphones, or the like, or combinations thereof. Outputs may include lights, dials, meters, or the like, or combinations thereof. With the user interface, the user may be able to control the features and operation of the display 208. Additional user feedback and output may be provided via the speaker 216.

The camera lens 212 is associated with an optical system that is used to track the moving target (e.g., clay pigeon). The camera generates images and/or video data of the field of view captured by the camera (hereafter called the "video data," the "image data" or both), as described in further detail below.

The light panel 220 may include one more light sources, such as light emitting diodes (LEDs), that are controlled by the processing system to illuminate and thereby communicate a current status of the shot tracking and feedback system 100 to a user.

Figure 3:
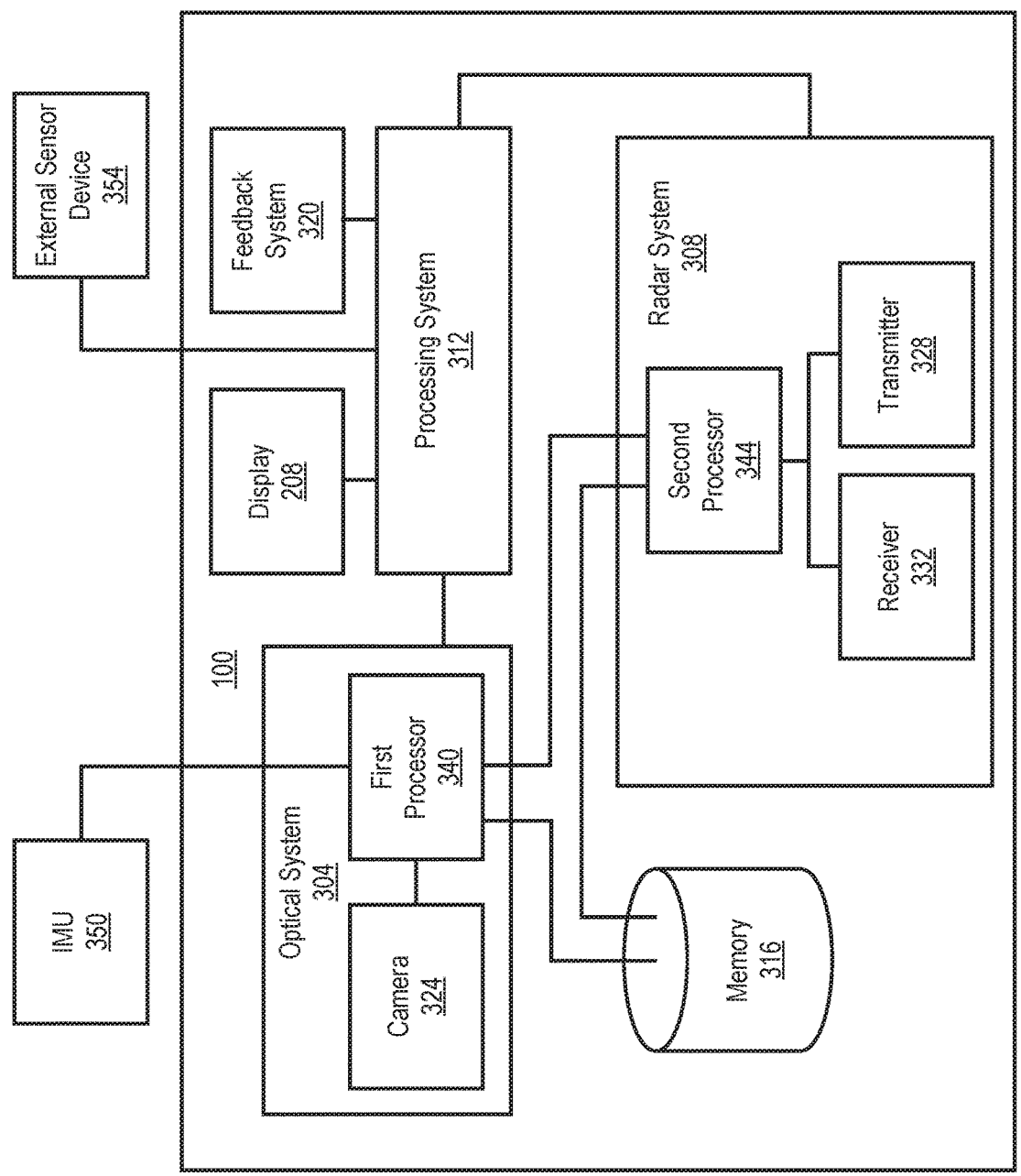
FIG. 3 is a block diagram of the components of the shot tracking and feedback system in accordance with one embodiment of the invention.

FIG. 3 is a block diagram of the shot tracking and feedback system 100 according to embodiments of the invention. As shown in FIG. 3, the shot tracking and feedback system 100 includes an optical subsystem 304, a radar subsystem 308, a processing system 312, memory 316, and a feedback system 320. The shot tracking and feedback system 100 may also include a location determining element and a communication element (not shown).

Generally, the location determining element determines a current geolocation of the shot tracking and feedback system 100 and may process a first electronic signal, such as radio frequency (RF) electronic signals, from a global navigation satellite system (GNSS) such as the global positioning system (GPS) primarily used in the United States, the GLONASS system primarily used in the Soviet Union, the Galileo system primarily used in Europe, or the BeiDou system primarily used in China. The location determining element may include satellite navigation receivers, processors, controllers, other computing devices, or combinations thereof, and memory. The location determining element may be in electronic communication with an antenna that wirelessly receives electronic signals from one or more of the previously-mentioned satellite systems and provide the electronic signal to location determining component. The location determining element may process each electronic signal, which includes data and information, from which geographic information such as the current geolocation is determined. The current geolocation may include geographic coordinates, such as the latitude and longitude, of the current geographic location of shot tracking and feedback system 100. The location determining element may communicate the current geolocation to processing system 312.

The communication element generally enables communication between shot tracking and feedback system 100 and external systems or devices, other than GPS systems. The communication element may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as WiMAX, Bluetooth™, or combinations thereof. In addition, the communication element may utilize communication standards such as ANT, ANT+, Bluetooth™ low energy (BLE), the industrial, scientific, and medical (ISM) band at 2.4 gigahertz (GHz), or the like. The communication element may be in communication with the processing element 24 and the memory 316. In various embodiments, the tracking and feedback system 100 may be configured to establish communication with more than one protocol or standard, and the communication element may include a transceiver for each protocol or standard, such as Bluetooth™, Wi-Fi, cellular, etc., with which the tracking and feedback system 100 can communicate. The communication element may be in electronic communication with an antenna that wirelessly transmits and receives electronic signals to and from other electronic devices, such as a smartphone, a tablet, a laptop, or a desktop computer, or communication network interfaces such as a Wi-Fi router or a cell tower.

The optical subsystem 304 includes a camera 324 (including the camera lens 212 shown in FIG. 2A). In some embodiments, the optical system 304 includes two or more cameras 324. For the ease of discussion, the description that follows primarily refers to the use of one camera 324; however, it should be appreciated that the description also applies to embodiments in which the optical system 304 includes two or more cameras 324. Embodiments including two optical cameras 324 may be advantageous for determining the location of and tracking objects of unknown size may be tracked to determine a distance by using two images (as we do with our eyes). The second camera 324 is particularly advantageous for hunting or shooting live targets (because the size of a target is not known and stored in memory 316).

The camera 324 is configured to capture image data (video data when aggregated over time) including consecutive frames of objects in the field of view of the camera 324. In one embodiment, the camera 324 may selectively capture image data in response to one or more predetermined events determined to have occurred or conditions determined to have been satisfied by processing system 312. In another embodiment, the camera 324 may continuously capture image and/or video data. The camera 324 is located in the housing 204 of the shot tracking and feedback system 100 to capture image and/or video data of the target and/or other objects in the field of view associated with the target (e.g., trap house 104).

The camera 324 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality. In embodiments, camera 324 captures in each frame the objects present in the field of view. Camera 324 may create many such frames each second. The camera 324 may store the image and/or video data to any suitable portion of memory 316, which may be stored in a "rolling buffer" format such that stored data is overwritten periodically, such as every 15 minutes or every hour, unless a user provides an input to the user interface indicating that the image data is no longer desired to be collected and stored in memory 316.

The radar system 308 is a radio detection and ranging (RADAR or radar) sensor system. This radar system 308 is operable to detect object(s), in particular the shot, located within a radar sensor field of the radar system 308 based on detections of returns (reflections) of transmitted radar signals from the detected object(s). The radar system 308 may include one or more radar sensors and/or transducers that may utilize radar, Light detection and ranging (LIDAR), ultrasound, or other techniques to determine a current location of an object. The radar system 308 may include one or more radar sensors that are configured to transmit radar signals (e.g., RF signals) in a direction, receive using one or more individual radar sensors reflected radar signals from an object, and output radar sensor signals based on the reflected radar signals. These radar sensor signals may include, for example, analog signals that corresponding to unprocessed measurements associated with each individual radar sensor's radar transmission and time of return for its respective reflected radar signal. In some embodiments, the radar signals are used by the processing system 312 to determine the location of and speed of each shot.

More particularly, the radar system 308 generally includes a radar transmitter 328 and one or more radar receivers 332. In embodiments, each radar receiver 332 may include or be coupled with any number of number of antennas. For example, the radar system 308 may include three radar receivers 332 arranged in (separated by) a triangular configuration such that a first radar receiver 332 is vertically aligned with a second radar receiver 332, and a third radar receiver 332 is horizontally aligned with the second radar receiver 332. This arrangement may enable the radar subsystem 308 and processing system 312 to determine a location, velocity of, and an angle of a shot. Alternatively, the radar system 308 may include a radar receiver 332 including or coupled with three receive antennas arranged in (separated by) a triangular configuration such that a first antenna is vertically aligned with a second antenna, and a third antenna is horizontally aligned with the second antenna.

The data determined by the radar system 308 may include, for instance, information relating to the velocity, position, range, azimuth angle, or any other information corresponding to an object of interest, such as the shot. The reflected radar signals collected by the radar system 308 are used by the processing system 312 to determine the position of an object (e.g., the shot) for any given moment of time.

The radar transmitter 328 outputs radar signals (e.g., radio-frequency signals of a particular frequency or band of frequencies) in the radar sensor field of the radar system 308, receives a reflection of radar signals reflected from an object (e.g., the shot) located in the radar sensor field, and outputs a radar sensor signal corresponding to the received reflection. The output of the radar sensor may be provided to the processing system 312 for further processing.

The radar system 308 may be controlled by processing system 312 to operate and generate radar data based on radar signal reflections when instructed or continuously.

The processing system 312 may include one or more processors, microprocessors, microcontrollers, digital signal processors (DSPs), field-programmable gate arrays (FPGAs), analog and/or digital application-specific integrated circuits (ASICs), or the like, or combinations thereof. The processing system 312 may generally execute, process, or run instructions, code, code segments, software, firmware, programs, applications, apps, processes, services, daemons, or the like, or may step through states of a finite-state machine, or combinations of these actions. The processing system 312 may be in communication with the other electronic components through serial or parallel links that include address busses, data busses, control lines, and the like.

The processing system 312 may be configured to retrieve, process and/or analyze data stored in memory 316, to store data in memory 316, to replace data stored in the memory 316, to analyze reflected radar signals and output radar sensor signals corresponding to the received reflection, generate shot data, capture video and/or image data, generate target data, receive commands, control various functions of the systems, etc.

In some configurations, the processing system 312 may consist of a single microprocessor or microcontroller. However, in other configurations, the processing system 312 may comprise a plurality of processing devices (e.g., microprocessors, DSPs, etc.). In embodiments, the processing system 312 may include a first processor 340 located within optical system 304 and a second processor 344 located within radar system 308, such that each processor 340, 344 is configured to control and perform different operational functions of the processing system 312. For example, the first processor 340 may be configured to control the optical system 304 and the second processor 344 may be configured to control the radar system 308. One of the processors 340, 344 may also be utilized to perform additional operational functions of the processing system 312, such as analyzing the data received from the optical system 304 and the radar system 308 and control the presentation of information provided to the user using the feedback system 320, which includes a display 208.

The processing system 312, which may include the first processor 340 configured to perform the following functions, may be configured to perform video analysis techniques (using a suitable video processing algorithm) on image (and/or video) data that may be stored in memory 316. The suitable algorithms may include one or more of a linear classifier algorithm, a support vector machine algorithm, a quadratic classifier algorithm, a kernel estimation algorithm, a boosting meta-algorithm, a decision tree algorithm, a neural network algorithm, a learning vector quantization algorithm, etc. The processing system 312 may analyze a target located in the field of view (the captured image and/or video data) or a shot located in the radar sensor field (radar data based on radar signal reflections) and calculate a velocity and a location of the target or shot. To do so, the processing system 312 may be configured to retrieve from memory 316 and analyze one or more frames of image and/or video data to identify an object corresponding to the target. In embodiments, the processing system 312 may compare the identified target to one or more objects (e.g., the trap house) that have a known size (and possibly fixed location) within the field of view of the camera 324. Image data received from a first camera 324 can be analyzed by the processing system 312 to determine a distance to an object having a known size (e.g., object width) from the shot tracking and feedback system 100. As explained above, in embodiments in which the shot tracking and feedback system 100 is not used to identify the location of or track objects having a known size (e.g., object width), image data received from a second camera 324 in addition to the first camera 324 can be analyzed simultaneously by the processing system 312 to determine a distance to the object from the shot tracking and feedback system 100.

The processing system 312, which may include the second processor 344 configured to perform the following functions, may be configured to receive and analyze the reflected radar signals over time. For example, the processing system 312 may determine a velocity and location of one or more targets located in the radar sensor field over time. The processing system 312 may identify a shot located in the radar sensor field based on the radar sensor signals. The location and velocity of the shot may be determined by processing system 312 and stored in memory 316. In embodiments, the processing system 312 may utilize a timer or other point of reference in time (e.g., a timestamp) that is associated with radar data to track the location and velocity of the shot over time. The processing system 312 may calculate a distance of the shot from the shot tracking and feedback system 100 based on the shot velocity. In embodiments having multiple receive antennas, the processing system 312 may use interferometry to determine an angle of the shot. Because the location and velocity of the shot is determined and stored in memory 316 for tracking over time, a trajectory may be calculated for the shot by processing system 312. For example, by using the previous and current velocity and heading of the shot, the future path of the shot can be determined by processing system 312. This trajectory determination may be applied to any suitable sample size of previously tracked shot information. This trajectory information may be utilized to identify a complete trajectory of the shot and determine whether the shot hit the target. The processing system 312 may store the trajectory data in memory 316 to enable of this information with image data determined by using the optical system 304.

In embodiments, the processing system 312 may utilize radar sensor signals output from one or more radar transmitters to determine relevant information and to generate shot data. For example, the second processor 344 may execute instructions to analyze the radar sensor signals to identify the location and/or speed of the a located in each radar sensor fields, which may partially or wholly overlap. This may include, for example, converting radar sensor signals collected over a time period from analog signal to digital signals, analyzing the time of transmit and return associated with the radar sensor signals, and correlating each radar sensor signal to a particular radar sensor in a radar sensor array to determine a size, location and velocity of the shot located in the radar sensor field. Additional techniques may be implemented by the processing system 312 to exclude data corresponding to shots originating from other shooters (standing at other shooting stations 108).

In embodiments where the processing system 312 configures a first processor 340 and/or a second processor 344 to perform the functions described herein, each processor 340, 344 may function independently or together to implement the operational functions of the processing system 312. For instance, the first processor 340 and second processor 344 may execute one or more software programs or computer-readable instructions that implement the operations described herein. Alternatively, a single processor 340, 344 may perform the functions described herein and execute one or more software programs or computer-readable instructions that implement the operations described herein. Additionally, each of the processors 340, 344 may execute one or more software programs or computer-readable instructions that implement the operations described herein.

A shot typically travels at a significantly higher speed than a target thrown by a target throwing machine located in a trap house 104. The processing system 312 may configure the optical system 304 to collect image data at a first rate and the radar system 308 to collect radar data at a second rate. In embodiments, the second rate may be selected by the processing system 312 to ensure sufficient radar data to locate and track a shot. In some configurations, the second rate may be higher (faster) than the first rate.

The memory 316 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. As explained above, the memory 316 may include, or may constitute, a "computer-readable medium". The memory 316 may store the instructions, code, code segments, software, firmware, programs, applications, apps, services, daemons, or the like that are executed by the processing system 312. The memory 316 may also store settings, data, documents, sound files, photographs, movies, images, databases, and the like.

The feedback system 320 may include the display 208, light panel 220 and speaker 216 shown and discussed above with respect to FIGS. 2A and 2B. It will be appreciated that the feedback system 320 may include additional or fewer components. Additionally, the feedback system 320 may be coupled to a separate device (e.g., watch worn by the user or application running on the user's smart phone) that provides the feedback.

The feedback system 320 may be controlled by the processing system 312 to provide video and audio feedback to the user whether the shot hit or missed the target, how the shot missed the target, the score of the shot, the total score, any movement of the weapon or shooter prior to and during the shot, the shooter's heart rate or other biometric information, and the like. The informational feedback is stored in memory 316 and executable by the processing system 312 such that screen shots such as those shown in FIGS. 8A-8K are presented to the shooter on display 208 of the feedback system 320. The information provided to the shooter may be visual (e.g., via the display), audible (e.g., via the speaker 216), or any combination thereof.

Over time, the processing system 312 may store in memory 316 statistical data to help the shooter improve their performance. The statistical data may include, for example, a shot history, a reaction time, a percentage of successful shots that hit (or missed) the target, how the shot missed the target (e.g., above, below, ahead of or behind the intended target), an average score, average movement of the weapon or shooter prior to (and during) the shot, the shooter's heart rate or other biometric information, an average range to the target, the ammunition of the shot, the caliber of the ammunition, the type of arrow, the brand of the ammunition, or other relevant information of the ammunition (e.g., grain, powder, flight etc.), the make and model of the weapon, location of the shooting range, shot grouping (e.g., in various timeframes including but not limited to session, magazine, day, etc.), and other pertinent information and statistics relevant to the sport.

The optical system 304, radar system 308, processing system 312 and memory 316 may be incorporated into the housing 204 as described above. The internal components may be interconnected with one another and electrically coupled with one another to facilitate the various functionality described herein using wired or wireless interconnections or links. One or more commands may be transmitted by the processing system 206 to implement the functionality described herein.

The shot tracking and feedback device may also include a power supply (not shown). Power supply may be implemented as any suitable type of power source that facilitates power delivery to the components of the shot tracking and feedback device. Examples of the power supply include one or more external power sources, rechargeable batteries, solar panels, fuel cells, etc.

The shot tracking and feedback system 100 may include an inertial measurement unit (IMU) 350 and/or other external sensor devices 354. In some embodiments, the IMU 350 or other external sensor devices 354 are enclosed within housings separate from the shot tracking and feedback system 100 and utilize a communication element to wirelessly communicate with the shot tracking and feedback device 100.

The IMU 350 may be configured to monitor movement of the shooter and/or the weapon based on forces caused by acceleration to determine how much the shooter and/or weapon has moved. It will be appreciated that any motion sensor, such as accelerometers and/or gyroscopes, that may determine motion may be used in the IMU 350.

The IMU 350 (or other similar device) also measures the attitude of the weapon and may also collect data that may be used to determine when a shot was taken. The data or determined attitude of the weapon before, during and after the shot may also be shared with and analyzed by the processing system 312. This data, in combination with the optical and radar data, may be used to provide feedback to the shooter about their performance and unintentional movements. Once the IMU 350 is in communication with the shot tracking and feedback device 100, this orientation and attitude data may be used by processing system 316 to provide audible and/or visual feedback (warning) if the weapon is determined to be positioned or being used in an unsafe manner. For example, the processing system 312 may determine whether the weapon is pointed anywhere other than down-range and notify the user of the dangerous condition using audible and/or visual feedback.

External sensor devices 354 may include any number or type of sensors configured to measure, monitor, and/or quantify one or more environmental or user characteristics. The sensor measurements may result in the acquisition and/or generation of different types of sensor data which may be processed by the processing system 312 (e.g., first processor 340). Such sensor data may include processed sensor data (e.g., data indicated actual measured values) and/or the raw sensor data output). The sensors may include perspiration detectors, heart rate detectors, respiratory detectors, thermometers, other biometric sensors, compasses, accelerometers, gyroscopes, photodetectors, light sensors, photoresistors, photodiodes, humidity, ultraviolet rays, etc. In embodiments, any or all of the aforementioned sensors may be enclosed within the housing of the shot tracking and feedback device 100. For example, processing system 312 may receive motion signals from an accelerometer within the housing of the shot tracking and feedback device 100, determine movement of the shot tracking and feedback device 100 (e.g., moving to each shooting station 108 in the trap field 102) and automatically prompting the user of information on the user interface presented on display 208.

In embodiments, the external sensor device 354 may utilize a communication element to wirelessly communicate with the shot tracking and feedback device 100. An external sensor device 354 that provides sensor data relating to a shooter's heart rate and/or respiratory status may be used by the processing system 312 to associate and track the shooter's heart rate and respiratory rate with shooting performance. The processing system 312 may also use this information to provide shooting performance feedback to the shooter and may help the shooter understand their stress level so that they can relax and improve their concentration and performance during the shooting.

As explained above, the shot tracking and feedback system 100 is aligned at each shooting station to the trap house 104. The shot tracking and feedback system 100 captures radar data and image data as described above for each shot that a user takes at each shooting station 108 in the trap field 102. The shot tracking and feedback system 100 provides performance feedback immediately following each shot or after the user completes the course.

Figure 4:
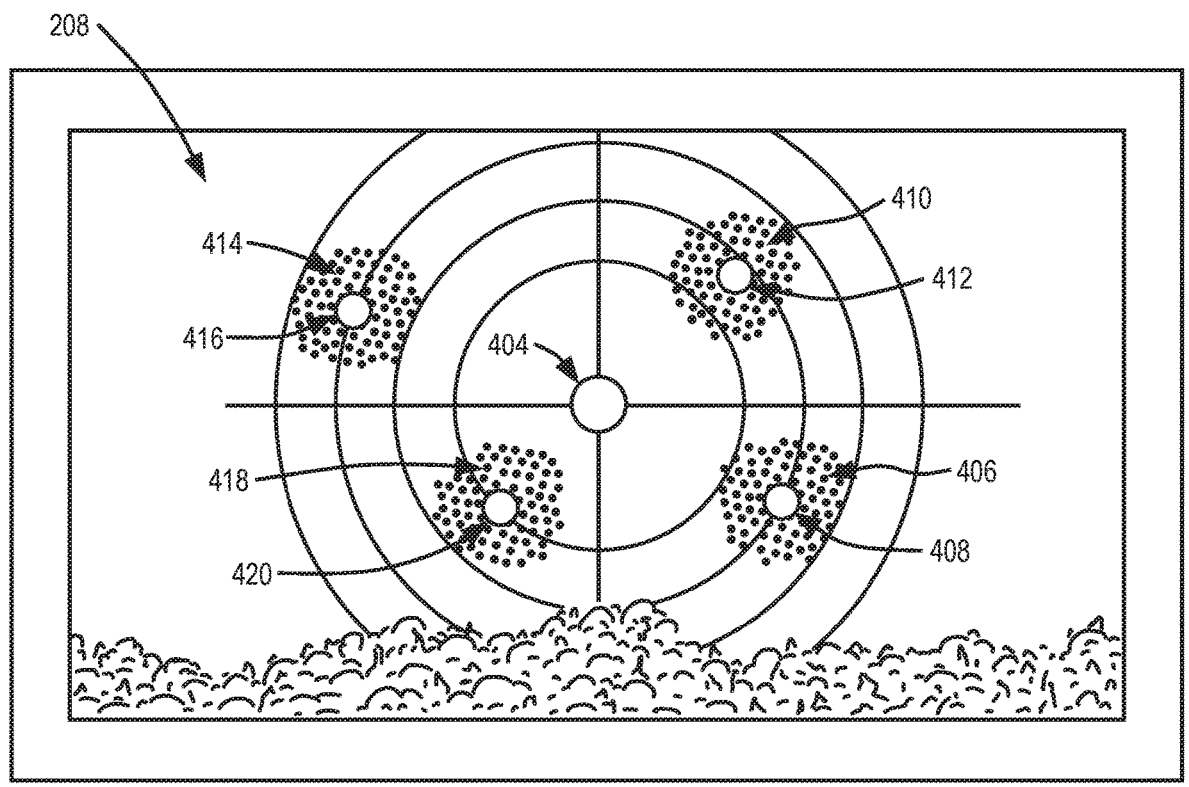
FIG. 4 is a user interface in accordance with an embodiment of the invention.

FIG. 4 is a depicts graphical performance feedback presented on a display 208 after a plurality of shots have been analyzed by processing system 312. The graphical feedback includes crosshairs, a center point corresponding to a target location 404, a location of a first shot center 408 associated with a first shot, a second shot center 412 associated with a second shot, a third shot center 416 associated with a third shot, and a fourth shot center 420 associated with a fourth shot are presented. In embodiments, the processing system 312 may determine based on a user input that one or more shots are fired from a shotgun and present estimated shot clouds for such shots. For example, the processing system 312 may determine the location of and present a first shot cloud 406 associated with the first shot, a second shot cloud 410 associated with the second shot, a third shot cloud 414 associated with the third shot, and a fourth shot cloud 418 on the display 208.

In embodiments, the processing system 312 may analyze the determined shot locations and determine that the user the first shot was down and to the right of the target, the second shot was up and to the right of the target, the third shot was up and to the left of the target, and the fourth shot was down and to the left of the target. Performance feedback summarizing the plurality of shots may be provided in graphical form, as shown in FIG. 4, or in textual form.

Figure 5B:
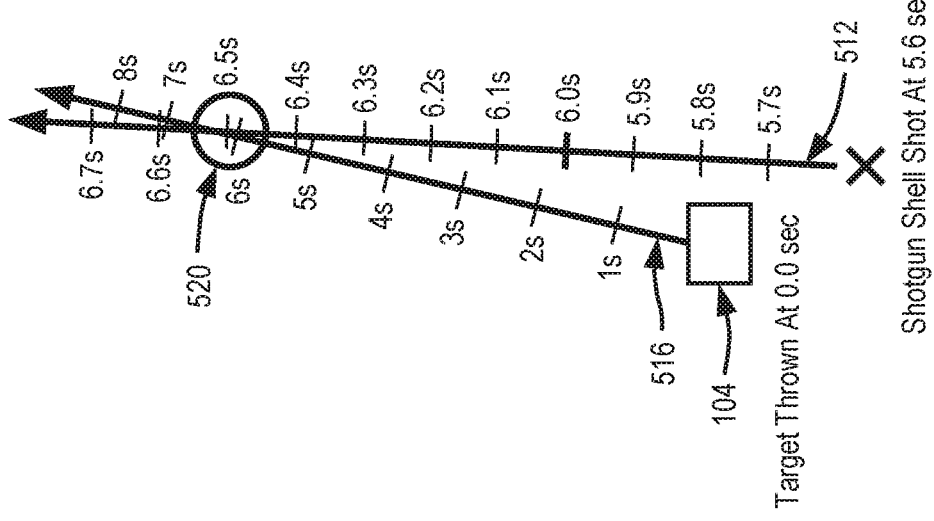
FIG. 5B is a schematic diagram showing the shot path overlaid with the target path in accordance with one embodiment of the invention.
Figure 5A:
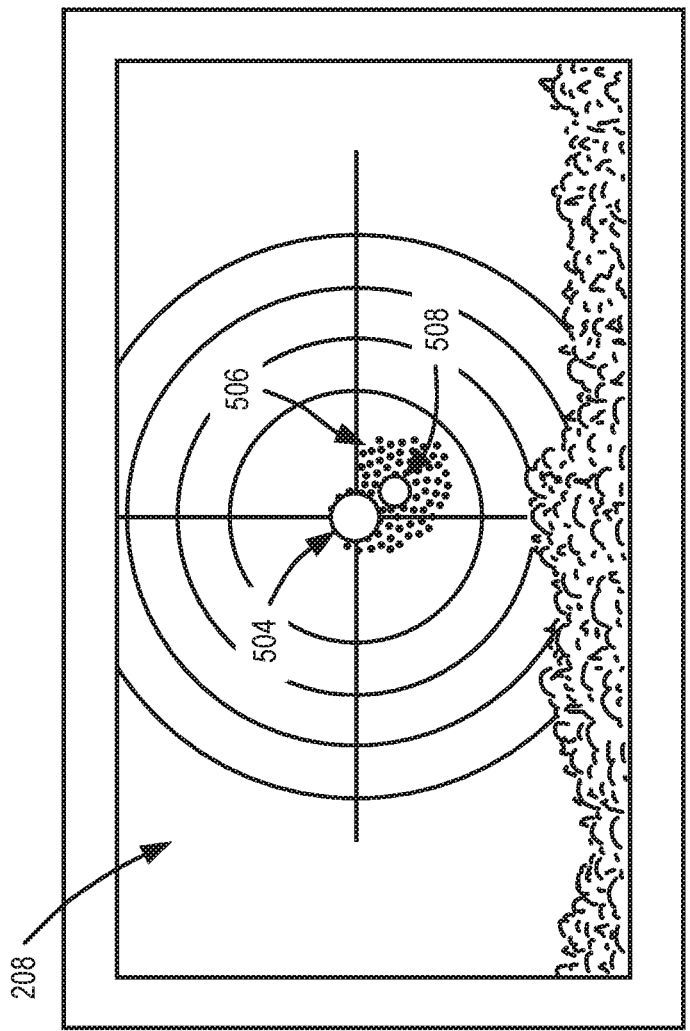
FIG. 5A is a user interface depicting performance feedback in accordance with one embodiment of the invention.

FIG. 5A depicts graphical feedback, a shot image, presented on a display 208 after a shot has been analyzed by processing system 312 and 5B is a schematic diagram showing a corresponding shot that hits the target, as determined by the shot tracking and feedback system according to embodiments of the invention. As shown in FIG. 5A, crosshairs, a center point corresponding to a target location 504, a location of the shot center 508, and an estimated shot cloud 506 are presented in the shot image. Specifically, the shot cloud 506 partially overlaps with target location 504, resulting in a hit. However, the hit could have been more accurate and the separation between shot center 508 and the target location 504 indicates the inaccuracy of the shot. The direction of the inaccuracy is indicated by the location of the shot center 508 being slightly down and to the right of the target location 504. FIG. 5B illustrates a bird's eye view of the shot trajectory 512 and the target trajectory 516 at precise times. It must be appreciated that the FIG. 5B is not drawn to scale and the times indicated in FIG. 5B do not correspond to a typical velocity of a target or a shotgun shell. The scale and times provided in FIG. 5B are chosen to simplify the explanation of the concept. Because the location of the trajectory of the shot and the location of the target intersect with another at a point 520 at the same time (6.5 seconds after the target started moving), the processing system 312 determines that the shot successfully hit the target. In particular, as shown in FIG. 5B, the shot trajectory overlaps the moving target trajectory at a point 520, the moving target arrived at point 520 6.5 seconds after it began moving and the shot arrived at point 520 at 6.5 seconds as well. In embodiments, the processing system 312 may utilize images from the camera may include, for example, image and/or video data output from the camera corresponding to the trajectory of the moving target (e.g., clay pigeon) to confirm its determination of a successful hit.

Figure 6B:
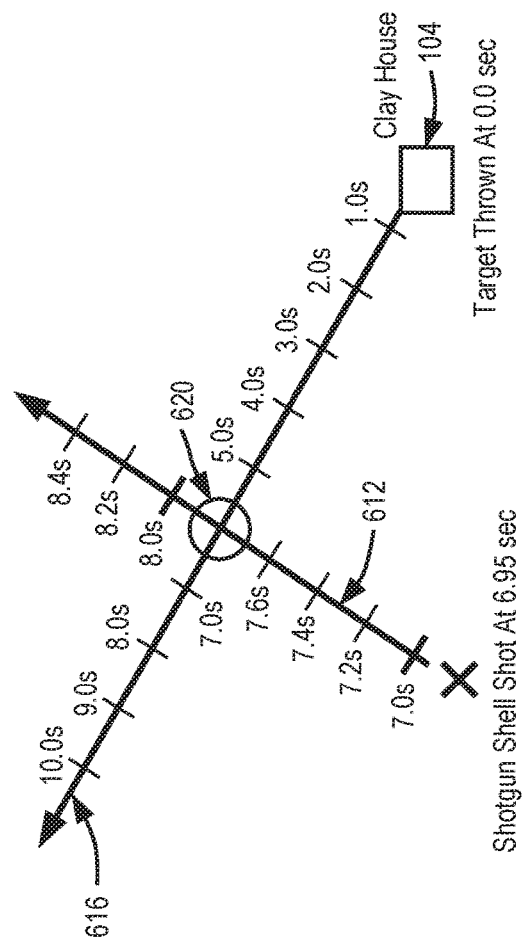
FIG. 6B is a schematic diagram showing the shot path overlaid with the target path in accordance with one embodiment of the invention.
Figure 6A:
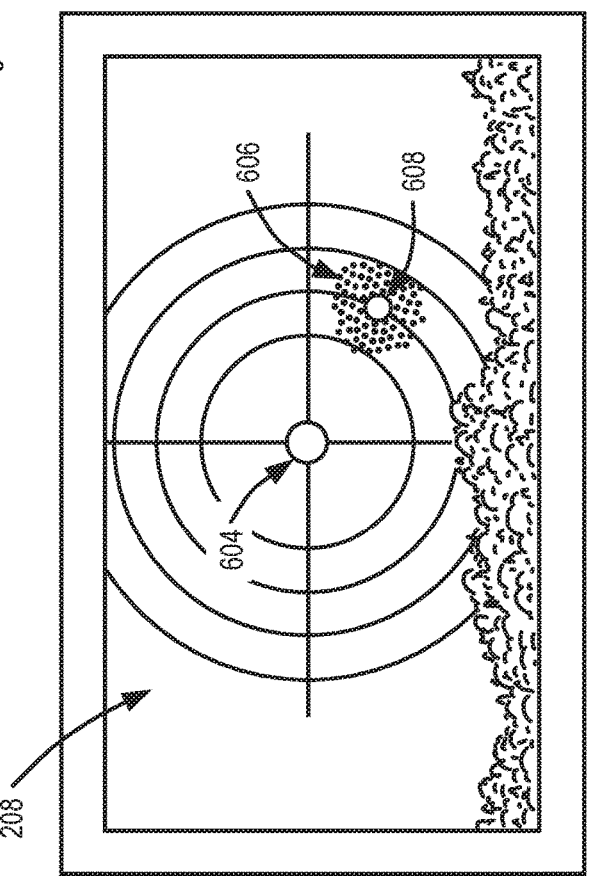
FIG. 6A is a user interface depicting performance feedback in accordance with one embodiment of the invention.

FIG. 6A depicts graphical feedback, a shot image, presented on a display 208 after a shot has been analyzed by processing system 312 and 6B is a schematic diagram showing a corresponding shot that misses the target, as determined by the shot tracking and feedback system according to one embodiment of the invention. As shown in FIG. 6A, crosshairs, a center point corresponding to a target location 504, a location of the shot center 508, and a shot cloud 506 are presented in the shot image. Specifically, the shot cloud 506 does not overlap with target location 504, resulting in a miss. The direction of the miss is indicated by the shot center 610 being located below and to the right of the target location 604. FIG. 6B illustrates a view (from the shooter's perspective) of the target trajectory 616 and the shot trajectory 612 overlap. It must be appreciated that the FIG. 6B is not drawn to scale and the times indicated in FIG. 6B do not correspond to a typical velocity of a target or a shotgun shell. The scale and times provided in FIG. 6B are chosen to simplify the explanation of the concept. When the processing system 312 performs a comparison of a current location of the shot and a current location of the moving target over time, the processing system determines that the shot did not intersect with the moving target at the same time. In particular, as shown in FIG. 6B, although the shot trajectory overlaps the moving target trajectory at a point 620, the moving target arrived at point 620 approximately 6.0 seconds after it began moving and the shot arrived at point 620 at approximately 7.8 seconds after the moving target was thrown. As a result, the processing system 312 determines that the shot was 1.8 seconds late and that the shooter missed the target to the right.

Figure 7:
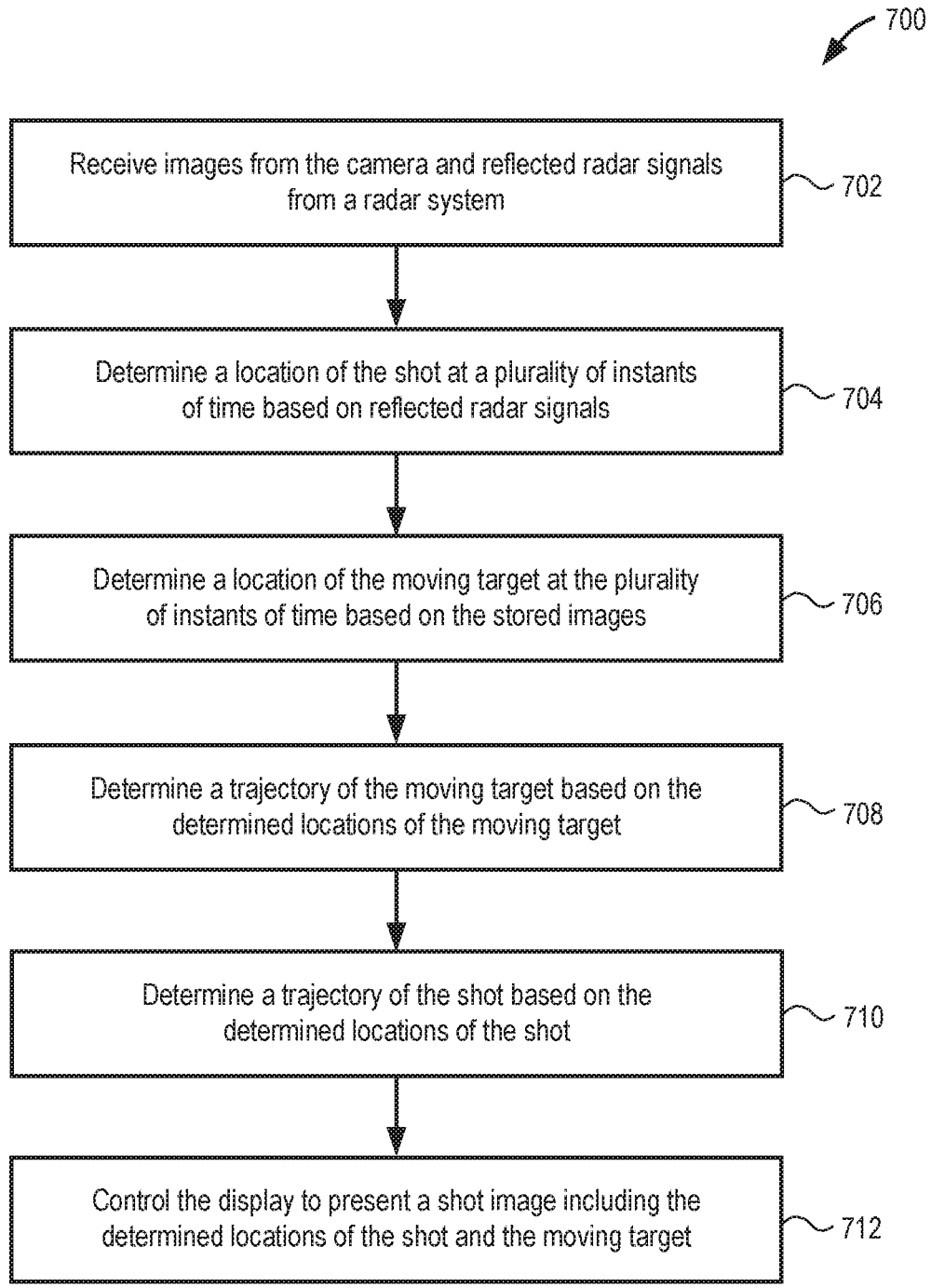
FIG. 7 is a flow diagram showing an exemplary process for determining whether a shot hit a target and for providing feedback to a user.

FIG. 7 illustrates an exemplary process for shot tracking and providing feedback 700 according to embodiments of the invention. It will be appreciated that the process may include additional or fewer steps and that the order of the steps may vary from that shown in FIG. 7 and described below.

The process 700 begins by receiving images from the camera and reflected radar signals from at least two radar receivers (block 702). These radar signals may include, for example, radar sensor signals output from one or more radar sensors and reflections received from the shot located in the radar sensor field. The images from the camera may include, for example, image and/or video data output from the camera corresponding to the trajectory of the moving target (e.g., clay pigeon). The method may further include one or more processors causing the camera and radar transmitter to begin capturing data and detecting radar signal reflections, respectively.

The process 700 continues by determining a location of the shot at a plurality of instants of time based on reflected radar signals (block 704). One or more processors may be used to analyze the reflected radar signal to determine a location of the shot at a plurality of instants of time. Process 700 then determines a location of the moving target at the plurality of instants of time based on the stored images (block 706). One or more processors may analyze captured image data to identify the precise location of the shot and/or the moving target at any moment in time.

The process 700 may continue by determining a trajectory of the moving target based on the determined locations of the moving target (block 708). One of more processor may analyze the determined locations of the moving target to determine a trajectory of the target. The process 700 may continue by determining a trajectory of the shot based on the determined locations of the shot (block 710). One of more processor may analyze the determined locations of the shot to determine a trajectory of the shot.

The process 700 may continue by controlling the display to present a shot image including the determined locations of the shot and the moving target (block 712). This information may be presented to the user on a display in any suitable manner. The performance feedback may include a graphic or text indicating how the shot hit or missed the target (e.g., above or below, to the right or left, etc.) by presenting a shot image including the determined locations of the shot and the moving target. In embodiments, one or more processors may utilize a communication element to control a display of a remote device to present the shot image and related information on the remote display.

In embodiments, the determined locations of the shot and the moving target included in the shot image correspond to one of the plurality of instant of time when the shot and the moving target are substantially equal distances from a radar antenna element and camera, respectively. In embodiments, other feedback information as described herein may be presented in accordance with the screenshots shown and described with reference to FIG. 9.

Figure 8:
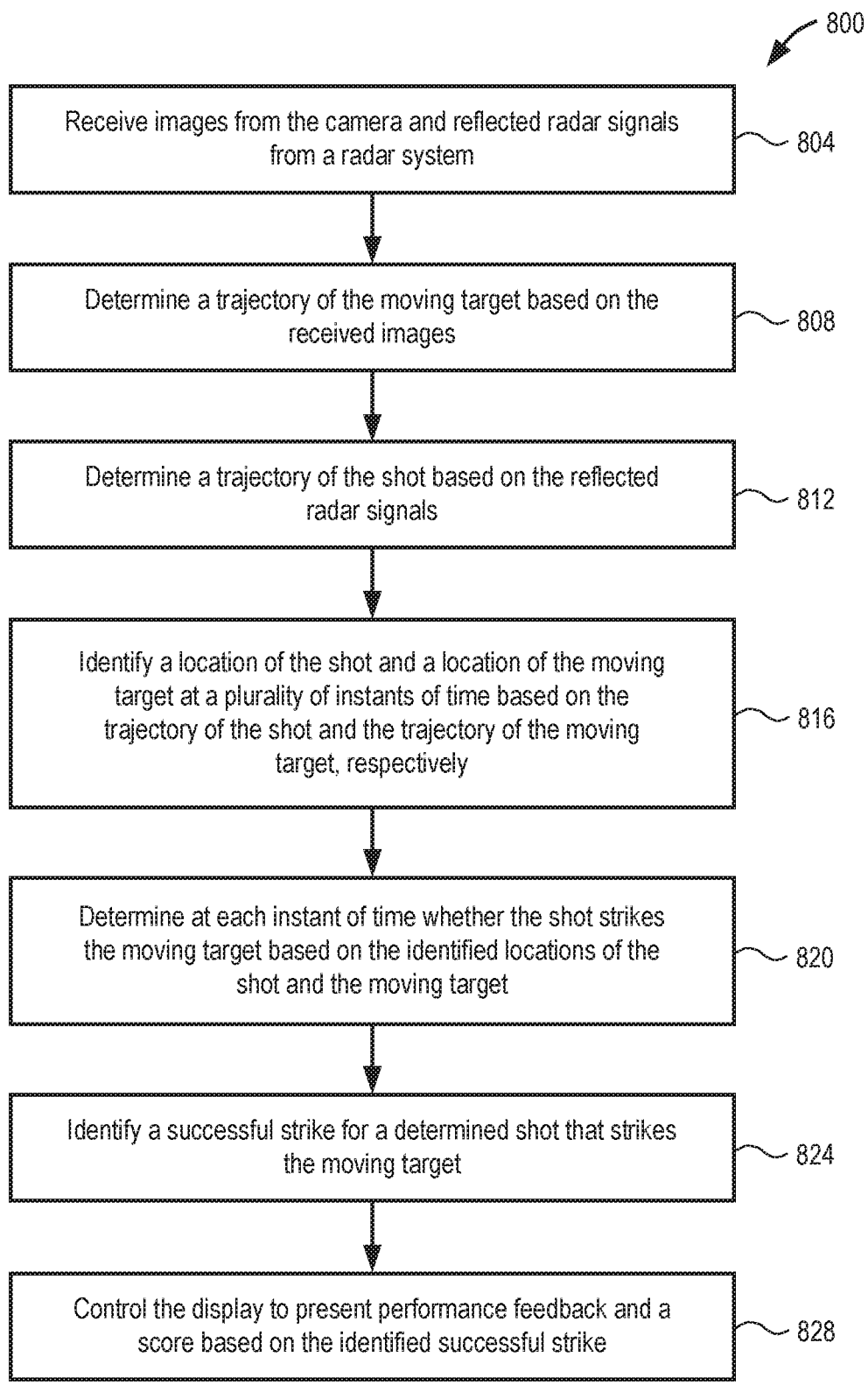
FIG. 8 is a flow diagram showing an exemplary process for determining whether a shot hit a target and for providing feedback to a user.

FIG. 8 illustrates an exemplary process for shot tracking and providing feedback 800 according to embodiments of the invention. It will be appreciated that the process may include additional or fewer steps and that the order of the steps may vary from that shown in FIG. 8 and described below.

The process 800 begins by receiving images from the camera and reflected radar signals from at least two radar receivers (block 804). The process 800 continues by determining a trajectory of the moving target based on the received images (block 808). One or more processors may be used to analyze the velocity and/or location of the moving target located in the camera field of view. The location and/or velocity of the moving target may be relative to a stationary device in the field of view of the camera (e.g., the trap house from which the clay pigeon is thrown or launched).

The process 800 continues by determining a trajectory of the shot based on the reflected radar signals (block 812). One or more processors may be used to analyze the velocity and/or location of the shot located in the radar sensor field of the radar sensor to determine a trajectory of the shot. In some embodiments, the trajectory is determined by analyzing captured data corresponding to the reflected radar signals and extrapolating the trajectory of the shot based on the trajectory of the reflected radar signals in the captured data.

The process 800 continues by identifying a location of the shot and a location of the moving target at a plurality of instants of time based on the trajectory of the shot and the trajectory of the moving target, respectively (block 816). One or more processors may identify the trajectory of the shot and the trajectory of the moving target together with time stamps or other timing information associated with the reflected radar signals and captured image data to identify the precise location of the shot and the moving target at any moment in time.

The process 800 continues by determining at each instant of time whether the shot strikes the moving target based on the identified locations of the shot and the moving target (block 820). One or more processors may be used to compare the timing and location information of the shot with the timing and location information of the moving target.

Determining whether the shot strikes the moving target may include the processing system determining whether the moving target has broken into at least two pieces based on the image of the moving target for each instant of time. The processor may further determine that the shot strikes the moving target at an instant of time when the moving target has determined to break into at least two pieces based on the stored images.

In some embodiments, the process 800 may include determining whether the shot strikes the moving target by identifying an intersecting point of the trajectory of the shot and the trajectory of the moving target, determining a first time instant when the trajectory of the shot is located at the intersecting point, determining a second time instant when the trajectory of the moving target is located at the intersecting point, and determining whether the first time instant substantially coincides with the second time instant. For example, the processing system may determine a first time instant when the trajectory of the shot is determined to be located at the intersecting point, a second time instant when the trajectory of the moving target is located at the intersecting point, and whether the shot struck the moving target based on the determined first and second time instances, such that a strike occurs when the first and second time instances are substantially equal. In embodiments, process 800 may take a determined or stored velocity of the shot and a velocity of the moving target into account when determining the first and second time instances.

The process 800 may continue by identifying a successful strike for a determined shot that strikes the moving target (block 824). One or more processors may determine that a shot that strikes the moving target is successful if the target has broken into for example at least two pieces, as explained above, and generate feedback to identify that the strike was successful.

The process 800 may continue by controlling the display to present performance feedback and a score based on the identified successful strike (block 828). The score may be determined by comparing the analysis of the moving target pieces and assigning a score based on, for example, the relative sizes of the two pieces or based on the location of the shot successfully striking the target or other relevant data. This information may be presented to the user on a display in any suitable manner. The performance feedback may include a graphic or text indicating how the shot hit or missed the target (e.g., above or below, to the right or left, etc.) by presenting a shot image including the determined locations of the shot and the moving target. In embodiments, other feedback information as described herein may be presented in accordance with the screenshots shown and described with reference to FIG. 9.

The process 800 may further include receiving motion data from an IMU, analyzing the received motion data to identify abrupt movements, and controlling the display provide feedback based on the identified slight or abrupt movements. This information can be used to provide feedback to the user, such as for example, gun hold position, reaction time, follow through, flinching, stopping, etc.

The process 800 may further include receiving data from other sensors, analyzing the received data from the sensors, and controlling the display to provide feedback based on the received data. For example, the external sensor may be a heart rate sensor and the data may be analyzed to determine whether the shooter's heart rate exceeds a certain threshold or increases above a certain baseline level and provides an audible or visual feedback that warns the user that their heart rate is high. Alternatively, the heart rate data may be presented along with the data indicating whether the user hit or missed the moving target with their shot.

Figure 9:
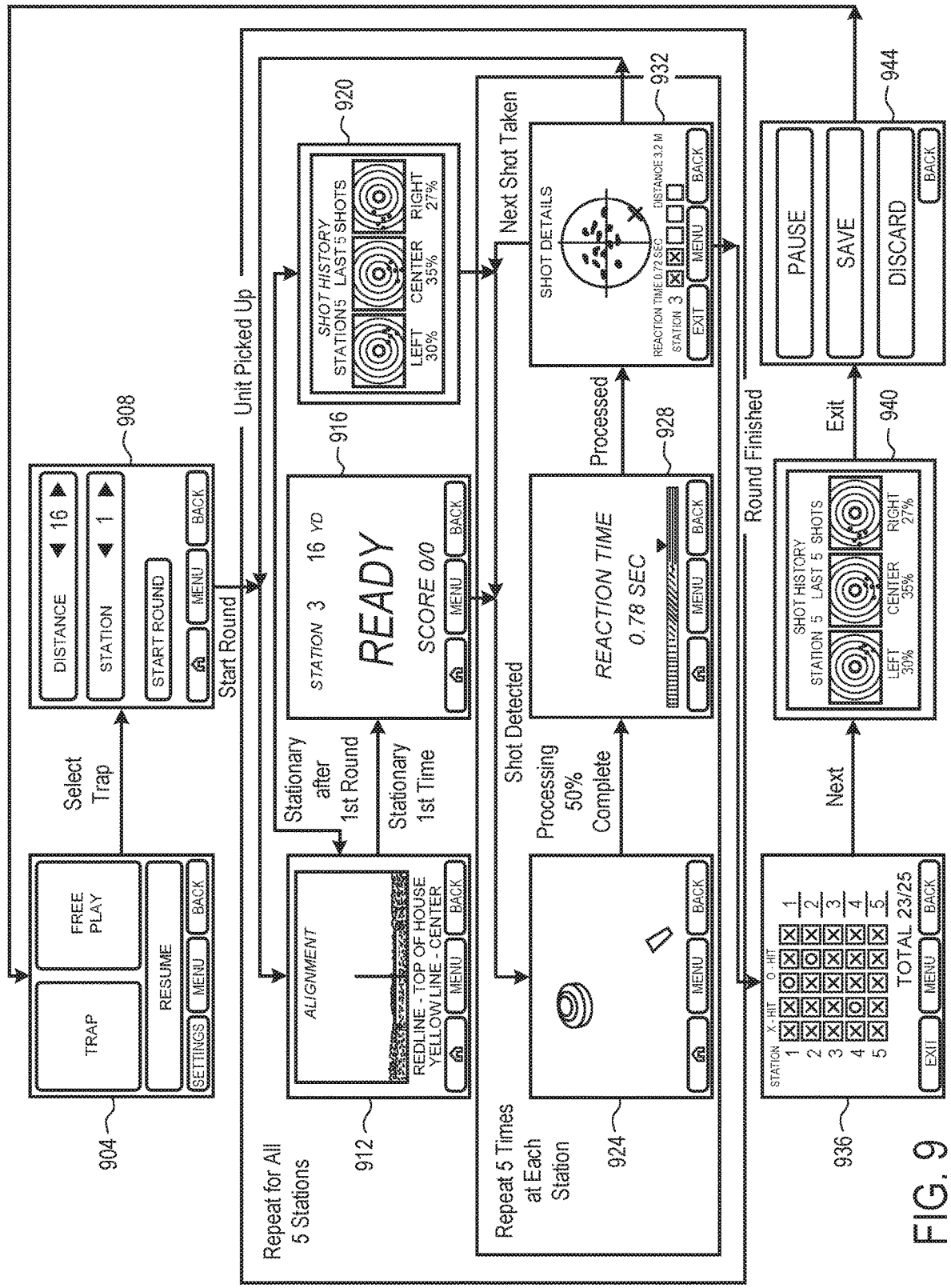
FIG. 9 provides exemplary user interface screens associated with the shot tracking and feedback system in accordance with one embodiment of the invention.

FIG. 9 illustrates additional user interfaces that may be presented on display 208 for use by the shooter of the shot tracking and feedback system. The user interfaces may be presented during and before the processes described above with respect to FIGS. 7 and 8. It will be appreciated that the user interfaces provided in FIG. 9 are exemplary. Further, not all of the user interfaces need to be presented and additional user interfaces (not shown) may be presented to the user during the processes.

For example, the shooter may interact with the user interface as follows. The user may begin by selecting a new play and selecting the shooting trap (904). The player then starts a round by locating the device at the shooting station and aligning it to the trap house 104 and entering details on a shooting page (908). A user interface may be provided to assist with alignment of the device with the target launcher (house) (912). For example, a red line corresponding to alignment with the top of the trap house and a yellow line corresponding to alignment with the center of the trap house may be presented in the interface to assist with the alignment.

Once the shot tracking and feedback system 100 is aligned with the trap house 104, the shot tracking and feedback system 100 is ready to begin tracking. A user interface to indicate that the shot tracking and feedback system 100 is ready to begin tracking may be presented to the user (916). A user interface (920) that presents information about the user's shot history may be provided to the user prior to the user taking a shot.

Once the user takes a shot, the shot tracking and feedback system 100 tracks the shot and begins processing the image data and radar data collected during the shot. A user interface (924) may be presented to the user while the data is being processed. During the processing, once the target has been found, the user's reaction time may also be presented in a user interface (928). Once the processing of the shot is completed, the shot details may be presented to the user (932). The shot details (932) may include the reaction time and the distance to the target as well as whether the shot hit the target. These shot tracking steps are repeated and the user interfaces (924-932) are presented to the user for each of the five shots at each station. Once a user completes their five shots at a station, the process beginning with the alignment step is repeated and the related user interfaces (912-932) may be presented to the user, as explained above.

Once a user completes each of the five shots at each of the five stations, a user interface (936) may be presented, which shows both whether the shot hit the target and the scoring for each of the five shots at each of the five stations. The detailed shot history may also be presented to the user (940).

Once the user has completed the course, the user may the option to save or discard the collected data. An exemplary user interface (944) showing a user's option to save or discard collected data is shown. The user may also have the option to pause the game.

The invention has been described in relation to particular examples, which are intended in all respects to be illustrative rather than restrictive. Those skilled in the art will appreciate that many different combinations will be suitable for practicing embodiments of the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A shot tracking and feedback system comprising:
   a display;
   a radar transmitter configured to output radar signals in a radar sensor field, and a plurality of radar receivers each configured to receive reflected radar signals from the radar sensor field;
   a camera configured to collect images of a moving target in a field of view;
   a memory configured to store a plurality of images received from the camera;
   a processing system communicatively coupled with the memory, the processing system configured to:
      determine a location of the shot at a plurality of instants of time based on the reflected radar signals received by the radar receivers,
      determine a location of the moving target at the plurality of instants of time based on the stored images, and
      control the display to present a shot image including the determined locations of the shot and the moving target.

2. The system of claim 1, wherein the determined locations of the shot and the moving target included in the shot image correspond to one of the plurality of instant of time when the shot and the moving target are substantially equal distances from the camera.

3. The system of claim 1, wherein the processing system is further configured to determine whether the moving target breaks into at least two pieces based on the stored images, and identify a successful strike for the shot when the moving target is determined to break into at least two pieces.

4. The system of claim 1, wherein the shot comprises a plurality of pellets, wherein the processing system is further configured to determine a plurality of locations of the plurality of pellets, and wherein the shot image further includes the plurality of locations of the pellets.

5. The system of claim 1, wherein the processing system is further configured to determine a first distance from the shot to a radar transmitter, and determine a second distance from the moving target to the camera, wherein the determined locations of the shot and the moving target included in the shot image correspond to an instant of time when the first distance is substantially equal to the second distance.

6. The system of claim 1, wherein the processing system is further configured to determine a trajectory of the moving target based on the determined locations of the moving target at the plurality of instants of time, and to determine a trajectory of the shot based on the determined locations of the shot at the plurality of instants of time.

7. The system of claim 6, wherein the processing system is further configured to identify an intersecting point of the trajectory of the shot and the trajectory of the moving target, determine a first instant of time when the trajectory of the shot is located at the intersecting point, determine a second instant of time when the trajectory of the moving target is located at the intersecting point, and identify a successful strike for the shot when the first instant of time is substantially equal to the second instant of time.

8. The system of claim 1, further comprising a plurality of radar antenna elements, each radar antenna element electrically coupled to the radar transmitter or one of the plurality of radar receivers.

9. The system of claim 1, further comprising an inertial measurement unit (IMU) wirelessly coupled to the processing system and secured to a gun from which the shot is fired, wherein the IMU comprises a motion sensor configured to collect motion data corresponding to movement of the IMU and transmit the motion data to the processing system, and wherein the processing system is further configured to identify movements associated with the shot based on the received motion data.

10. The system of claim 1, wherein the memory is further configured to store a width of the moving target, a velocity of the moving target, a color of the moving target, and a distance to a location from which the moving target originated.

11. A shot tracking and feedback system comprising:
an optical subsystem comprising a camera configured to collect images of a moving target in a field of view;
a radar subsystem comprising a radar transmitter configured to output radar signals in a radar sensor field, and a plurality of receivers configured to collect reflected radar signals from the radar sensor field;
a processing system communicatively coupled with the optical subsystem and the radar subsystem, the processing system configured to:
receive the images and the reflected radar signals,
determine a location of the shot based on the reflected radar signals at a plurality of instants of time,
determine a location of the moving target based on the images at the plurality of instances of time,
determine a trajectory of the shot and a trajectory of the moving target based on the determined locations of the shot and the moving target at the plurality of instants of time, respectively, and
determine whether the shot strikes the moving target based on the determined trajectories of the shot and the moving target.

12. The system of claim 11, further comprising a display, and wherein the processing system is further configured to control the display to present a shot image including the determined location of the shot and the moving target.

13. The system of claim 12, wherein the shot comprises a plurality of pellets, wherein the processing system is further configured to determine a plurality of locations of the plurality of pellets, and wherein the shot image further includes the plurality of locations of the pellets.

14. The system of claim 12, wherein the processing system is further configured to determine a first distance from the shot to the radar transmitter, and determine a second distance from the moving target to the camera, wherein the determined locations of the shot and the moving target included in the shot image correspond to an instant of time when the first distance is substantially equal to the second distance.

15. The system of claim 14, wherein the processing system is further configured to identify a successful strike for the shot based on the first distance and the second distance.

16. The system of claim 11, wherein the processing system is further configured to identify an intersecting point of the trajectory of the shot and the trajectory of the moving target, determine a first instant of time when the trajectory of the shot is located at the intersecting point, determine a second instant of time when the trajectory of the moving target is located at the intersecting point, and identify a successful strike for the shot when the first instant of time is substantially equal to the second instant of time.

17. The system of claim 11, wherein the processing system comprises a first processor associated with the optical subsystem and a second processor associated with the radar subsystem, wherein the first processor is coupled to the second processor.

18. The system of claim 17, wherein the first processor determines the location and the trajectory of the moving target based on the reflected radar signals and the second processor determines the location and the trajectory of the shot based on the images.

19. The system of claim 11, further comprising an inertial measurement unit (IMU) configured to collect data corresponding to movement of the weapon and wirelessly communicate with the processing system, wherein the processing system is further configured to identify movements associated with the shot based on the received motion data.

* * * * *